Figure 1:
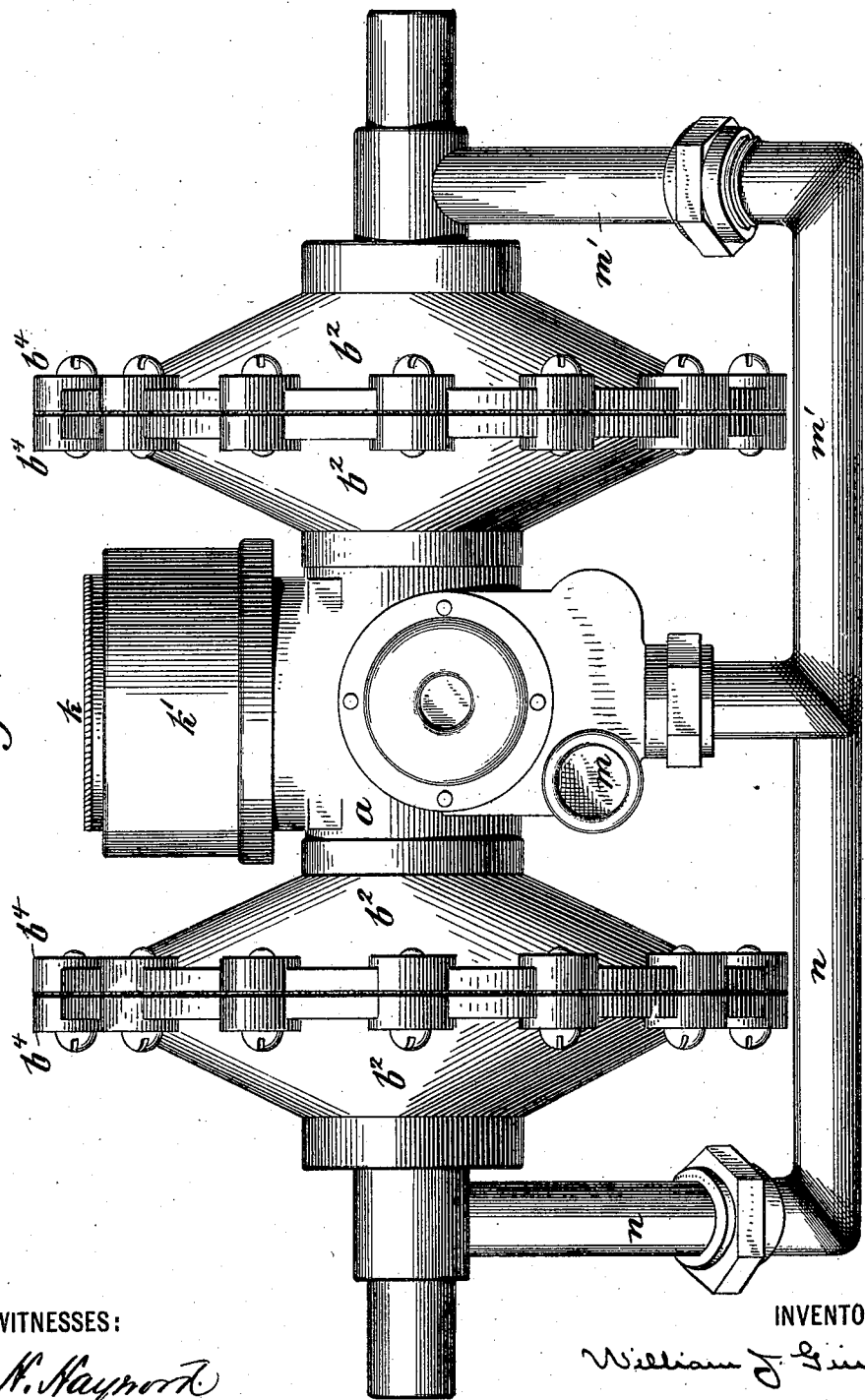

No. 648,947. Patented May 8, 1900.
W. J. GURD.
FLUID METER.
(Application filed Dec. 31, 1896.)
(No Model.) 6 Sheets—Sheet 1.

WITNESSES:
O. N. Raymond
A. L. Hayes.

INVENTOR
William J. Gurd
BY
Chas. F. Davis
his ATTORNEY

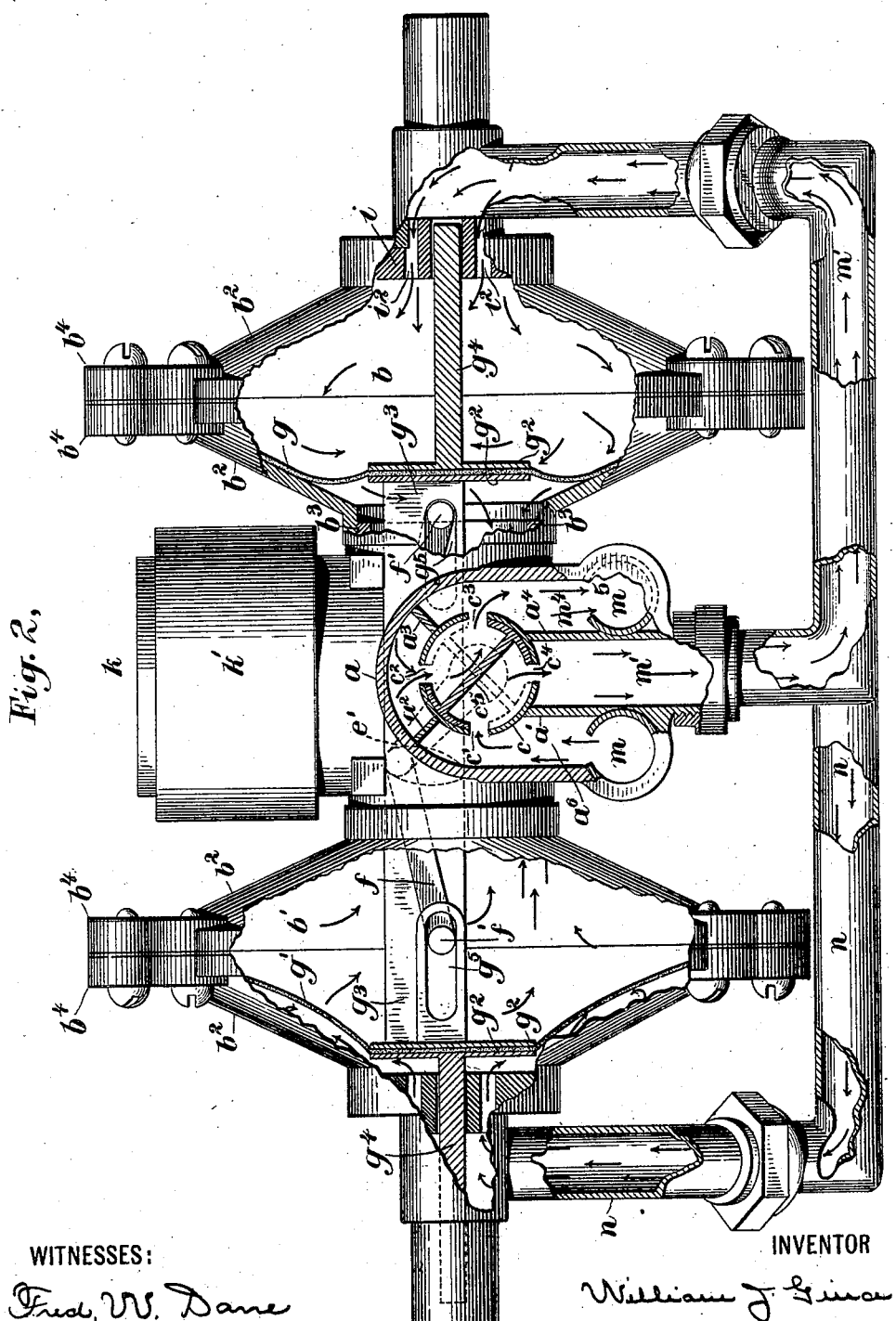

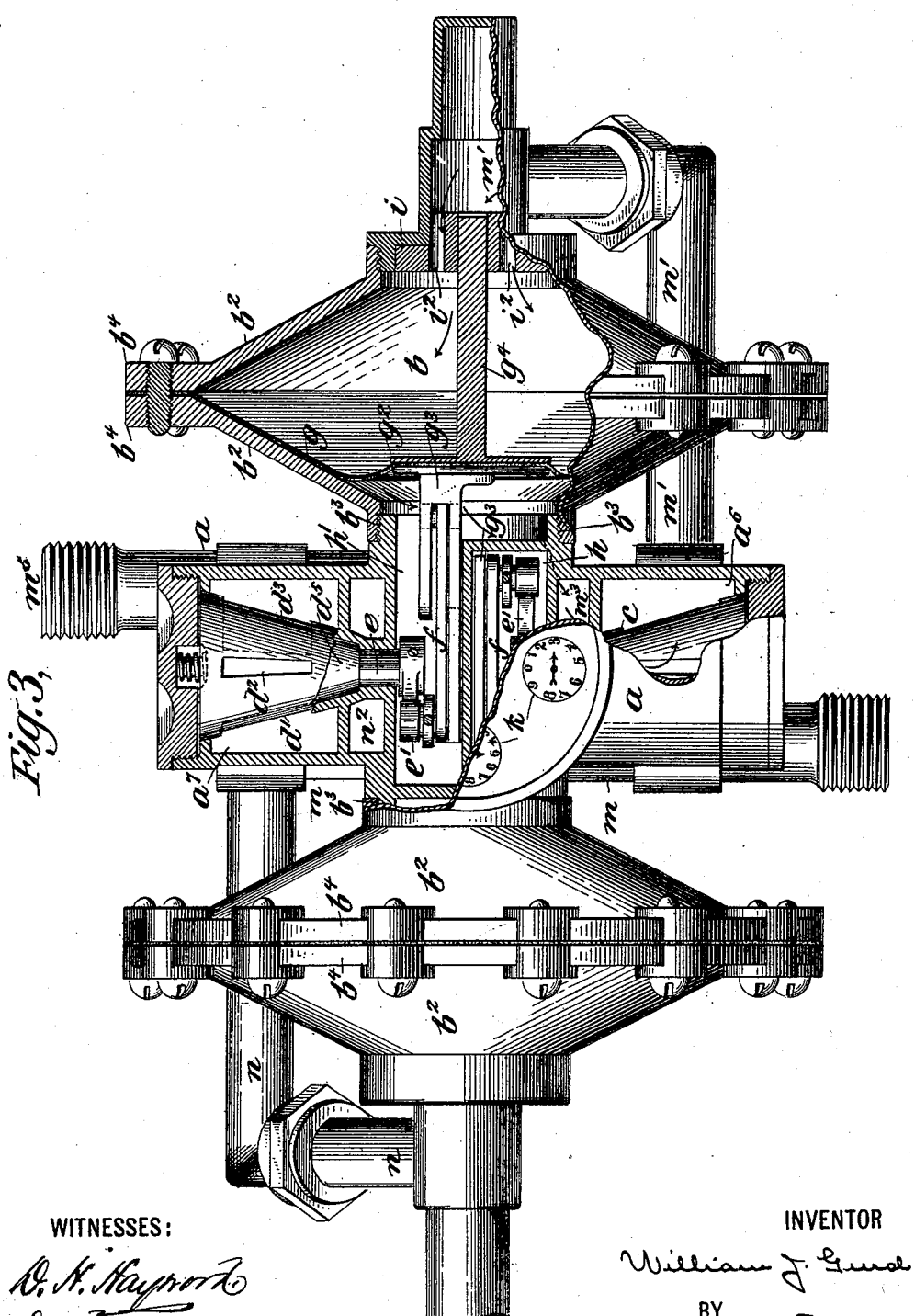

No. 648,947. Patented May 8, 1900.
W. J. GURD.
FLUID METER.
(Application filed Dec. 31, 1896.)
(No Model.) 6 Sheets—Sheet 4.
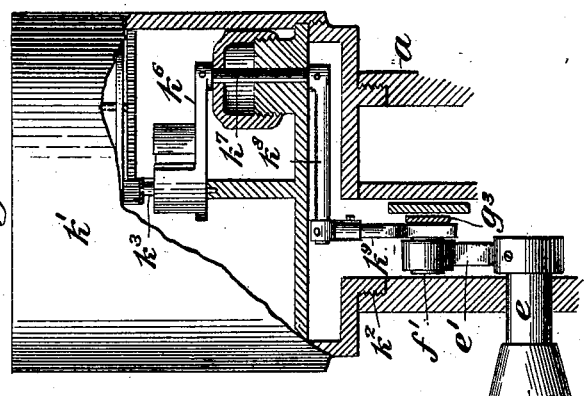
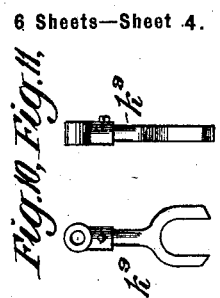
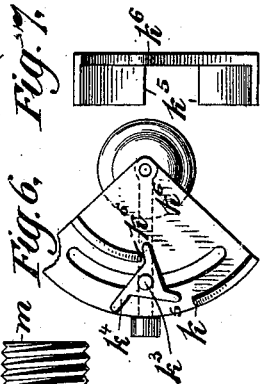
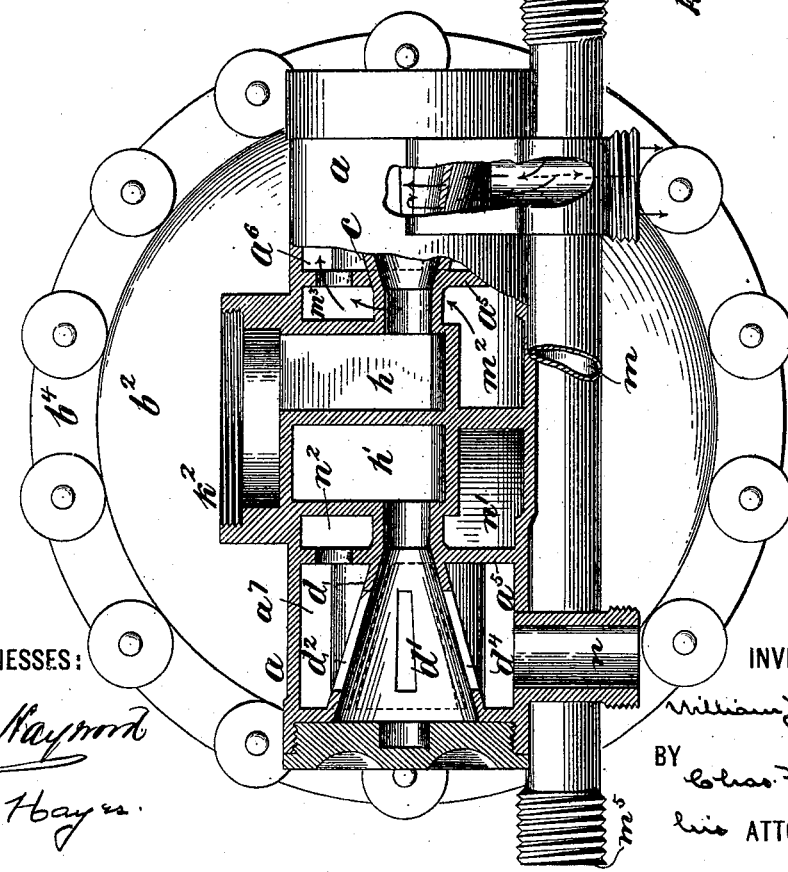
WITNESSES: INVENTOR
BY
ATTORNEY No. 648,947. Patented May 8, 1900.
W. J. GURD.
FLUID METER.
(Application filed Dec. 31, 1896.)
(No Model.) 6 Sheets—Sheet 5.
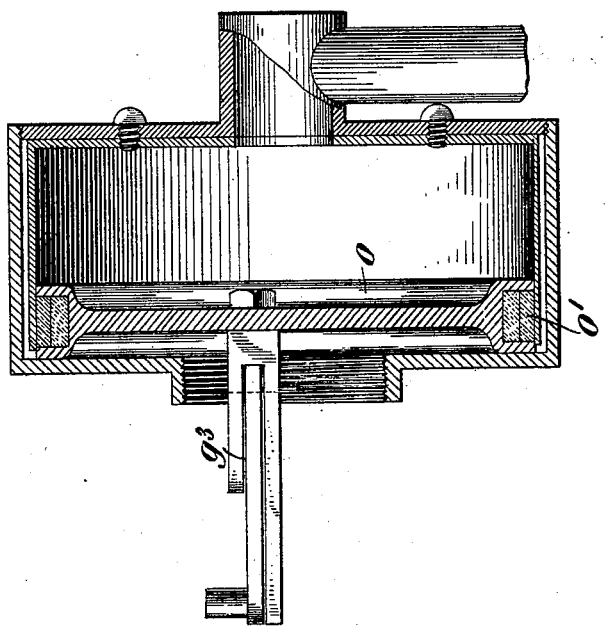
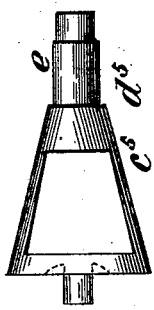
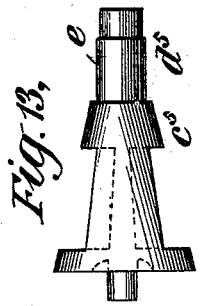
WITNESSES:
INVENTOR
William J. Gurd
BY
Chas. F. Davis
his ATTORNEY No. 648,947. Patented May 8, 1900.
W. J. GURD.
FLUID METER.
(Application filed Dec. 31, 1896.)
(No Model.) 6 Sheets—Sheet 6.
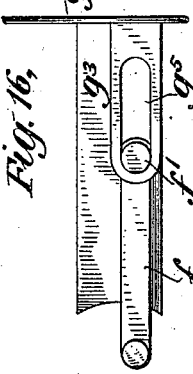
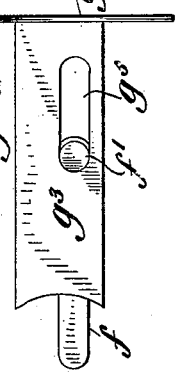
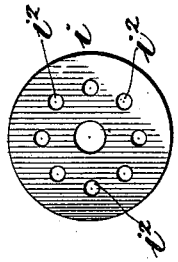
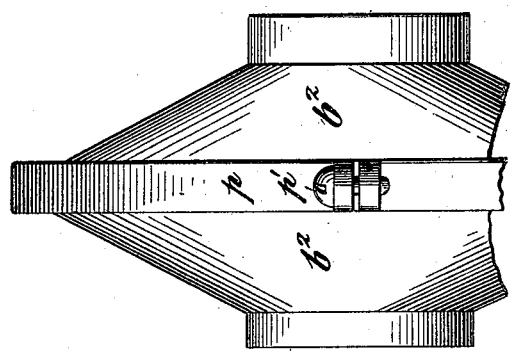
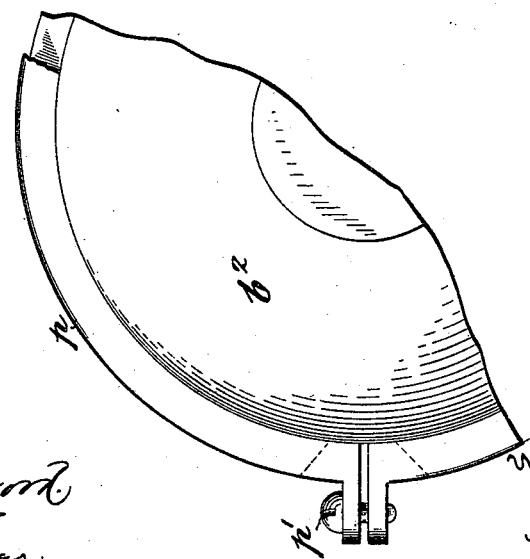
WITNESSES: INVENTOR
William J. Gurd
BY
his ATTORNEY

UNITED STATES PATENT OFFICE.

WILLIAM J. GURD, OF LONDON, CANADA.

FLUID-METER.

SPECIFICATION forming part of Letters Patent No. 648,947, dated May 8, 1900.

Application filed December 31, 1896. Serial No. 617,537. (No model.)

*To all whom it may concern:*

Be it known that I, WILLIAM J. GURD, a subject of the Queen of Great Britain, residing in London, Province of Ontario, Canada, have invented new and useful Improvements in Meters for Measuring and Registering Fluids, Gases, &c., of which the following description, taken in connection with the drawings herewith accompanying, is a specification.

My invention has for its object the automatic measurement of fluids or gases by mechanism acting with a minimum degree of friction and with equal certainty and precision, whether the fluid or gas is under high or low pressure. This object I secure by a construction and combination of parts embodying my invention, as hereinafter set forth in detail, and pointed out in the claims.

Referring to the accompanying drawings, Figure 1 represents a front elevation of a meter embodying my invention; Fig. 2, a front elevation of the same with certain of the parts broken away and in section to more clearly show the interior construction of the meter and certain of the water-passages; Fig. 3, a top view of the same, also showing certain of the parts broken away and in section; Fig. 4, a vertical section taken partly through the center of the meter with the index attachment removed and showing part of the frame or casting broken away; Fig. 5, a detail view showing one form of construction between the index and one of the valves; Fig. 6, a plan view of the plates of the index-operating mechanism shown in Fig. 5; Fig. 7, an edge view of the plate $k^6$. Figs. 8, 9, 10, and 11 represent front and edge views, respectively, of certain detached parts of the index-operating mechanism. Figs. 12, 13, 14, 15, 16, 17, 18, 19, and 20 represent side and edge views, respectively, of different detail parts, to be hereinafter referred to. Figs. 21, 22, and 23 represent modifications relating to the construction of the measuring-chambers, also to be hereinafter referred to.

To explain in detail, $a$ represents the outer frame or shell, within which the valves and certain other operating parts of the meter mechanism, to be hereinafter referred to, are supported. Upon opposite sides of this frame $a$ and having communication with the valve-chambers therein are chambers (represented at $b$ and $b'$) which I term the "measuring-chambers." These chambers, as shown in Figs. 1, 2, and 3, are each formed of two circular concave disks $b^2$ $b^2$, which are secured together at the outer edges by suitable fastening means, with the inner or adjacent disk or wall of each chamber having a screw-threaded connection with the frame at $b^3$ in Figs. 2 and 3, whereby the said disks forming the shell of the chambers $b$ and $b'$ are detachably connected with and supported by the frame $a$. This described manner of forming the shell of the chambers $b$ and $b'$ and connecting the same with the frame $a$ I have found to be a simple and convenient way for making up the several parts and assembling the same; but it will be obvious, as will hereinafter appear, that the same may be constructed and formed in any other desired manner without departure from my invention.

The frame $a$ is provided with two valve-chambers $a^6$ and $a^7$ adjacent to the opposite ends thereof, within which are located two valves $c$ and $d$, each being provided with four openings or ports $c'$ $c^2$ $c^3$ $c^4$ and $d'$ $d^2$ $d^3$ $d^4$, respectively, which ports or openings are each separated or cut off from communication with each other from the exterior of the valve by walls $a'$, $a^2$, $a^3$, and $a^4$, as more clearly shown in Fig. 2, the arrangement of the several dividing-walls for each of the two valves being the same. These valves $c$ and $d$ are each provided with valve-plugs $c^5$ and $d^5$, respectively, (shown in detail in Figs. 12 and 13,) which connect two of each of the four valve-ports, as in the ordinary four-way valve and as clearly shown in Fig. 2. The said valve-plugs $c^5$ and $d^5$ are each provided with a fixed stem or extension $e$ on their inner adjacent ends, which stems extend through an opening in one of the walls $a^5$ of the valve-chambers $a^6$ and $a^7$ into two separated chambers $h$ and $h'$, which latter open one into one measuring-chamber and the other into the second measuring-chamber, as more clearly shown in Figs. 3 and 4. Upon the inner projecting ends of these stems $e$ are secured crank-arms $e'$, which latter are connected through the medium of pivoted links $f$ with diaphragms $g$ and $g'$, which are located in the said measuring-chambers $b$ and $b'$, respectively, and by which the said valves are operated in a manner and for the purpose as will hereinafter be described. The said diaphragms $g$ and $g'$ are formed of a suitable flexible material that will be proof against the fluids or gases for which the meter may be used for measuring and are secured and clamped at their outer edges between the flat peripheral flanges $b^4$ $b^4$, with which the disks $b^2$ are provided, so as to divide each of the said measuring-chambers into two parts. Attached together and to the opposite sides of the center of these diaphragms are plates $g^2$ $g^2$, forming an unyielding and reinforced center to the latter, from one side of which projects a rigid stem or piston $g^3$, which extends into the said chambers $h$ and $h'$, as more clearly shown in Fig. 3. Those stems $g^3$ with which one end of the valve-connecting links $f$ are connected rest and slide upon the lower side or wall of the chambers $h$ and $h'$ and serve, in combination with rigid guide-rods $g^4$, which extend from one of the plates $g^2$ at the opposite side of the diaphragms into a suitable bearing $i$ in the outer or end wall of the chambers $b$ and $b'$, to support the diaphragms centrally as they are moved backward and forward by the action of the fluid or gas, as will be hereinafter set forth.

I will now describe the course or passage which the fluid or gas takes in passing through the meter to be registered and the action of the same upon the meter mechanism, which is as follows: The water (presuming that water is to be measured) enters the induction pipe or passage $m$ and when the valve-plug $c^5$ is in the position shown in Fig. 2 will enter the valve-chamber $a^6$ and take the course as indicated by the arrows, passing through the ports $c'$ and $c^4$ into a conduit-pipe $m'$, which communicates with the measuring-chamber $b$ at the right side thereof through openings $i^2$ $i^2$ in the guide-rod bearing $i$, as clearly shown in Figs. 2 and 3. The water thus entering the chamber $b$ from the right side moves the diaphragm to the opposite side thereof, as shown, and forces the water in that side of the chamber out, as indicated by arrows in Figs. 2, 3, and 4, through connecting-conduit passage-ways $m^2$ and $m^3$ into the valve-chamber at the upper part and from the inner end thereof and from thence through the ports $c^2$ $c^3$ and conduit-way $m^4$ to the outlet or eduction passage $m^5$. When the water has passed into the measuring-chamber $b$ from the right and moved the diaphragm to the left or opposite side of the chamber, as described, (which movement of the diaphragm operates the registering-index to indicate the amount of water received into the meter, as will hereinafter be described,) such movement of the diaphragm also operates the connecting valve-plug, which controls the flow of water to and from the second measuring-chamber $b'$, and regulates the same, so that the water, now that the chamber $b$ has been filled, will pass through the induction-pipe into the valve-chamber $a^7$ at the rear of the frame $a$ and pass through the ports of the valve $d$ in the same manner as described with relation to the valve $c$ into a conduit-pipe $n$, which communicates with the measuring-chamber $b'$ at the left side thereof, as clearly shown in Fig. 2. The water thus entering the chamber $b'$ at the left or outer side moves the diaphragm toward the opposite or inner side of the same, and thereby forces the water in that side out through conduit-ways $n'$ and $n^2$ into the valve-chamber $a^7$ at the upper part and from the inner end thereof and from thence through ports $d^2$ and $d^3$ into the outlet-passage $m^5$. It will be understood that the arrangement of the conduit-ways for the passage of the water from the induction-pipe through both of the valves and into the measuring-chambers and from the latter out through the valves of the eduction-pipe is the same. When the diaphragm in the chamber $b'$ has been moved to the right side of the latter, as described, such movement of the diaphragm will have operated the valve-plug $c^5$ to give the same a quarter-turn and move it to the position shown by dotted lines in Fig. 2, thereby allowing the water, now that the chamber $b'$ is filled, to pass through the ports $c'$ and $c^2$ of the valve $c$ and into the left side of the chamber $b$ through the outlet-ways before described. As the diaphragm is now moved to the right by the water entering the left side of this chamber, the water in such right side will be forced out through the conduit $m'$, through which it entered, through the ports $c^4$ and $c^3$, and into the eduction-pipe $m^5$. By means of this arrangement and operation of the diaphragm and valves it will be understood that the diaphragm of each chamber operates the valve which controls the flow of water to and from the opposite sides of the other chamber, whereby said valves will be automatically operated relative to the several conduits to alternately direct the water from the induction-pipe into one side of said measuring-chambers and open the ways for the water to be forced upon the opposite side of the chambers into the eduction-pipe and then reverse the entrance and outflow of the water to the opposite side of the chambers. In this manner a very accurate measurement of the fluid or gas passing through the meter may be taken, as the valves are operated by the diaphragm to change the flow of the fluid or gas only after a certain predetermined amount of the latter has entered the chamber and been registered.

It will be observed that the valve-plugs when operated by the diaphragms receive only a quarter turn or revolution, which movement is much less than the length of vibration or movement of the diaphragm, and in order to allow for this difference of movement I have provided the stems $g^3$ with an elongated slot $g^5$ therein, into which a pin $f'$ on the crank-connecting rods $f$ extends and slides. The length of said elongated slots $g^5$ is equal to the difference in movement of the diaphragm and valve, as will be obvious, and they also allow the diaphragms to move independently of the valves during the greater portion of their movement across the measuring-chambers without acting on the valves, the latter being moved only at the end of movement of the diaphragm.

The amount of fluid or gas entering the measuring-chambers $b$ and $b'$ is registered by an index $k$ of ordinary construction, which is operated from one of the diaphragms, as will be described. The said index is supported within a shell or casing $k'$, which, in the present instance and as more clearly illustrated in Figs. 4 and 5 has a detachable screw-threaded connection with the frame $a$ at $k^2$. The main spindle $k^3$ of the index, from which the several hands or fingers of the same are operated through the medium of connecting-gearing in the usual manner, is provided with a star or three-pronged plate $k^4$, secured thereon, the several prongs or points of which are adapted to be successively engaged to rotate the connected spindle and thereby the index by two projections $k^5$ $k^5$ upon a vibrating plate $k^6$, which latter is operated from one of the diaphragms through the medium of suitable connecting means.

The vibrating plate $k^6$ has a fixed connection with a vertical supporting-spindle $k^7$, which latter is mounted to turn or rotate in a suitable bearing in the index-frame and on its lower end is provided with a fixed arm or rod $k^8$, which is arranged in a plane parallel with the plate $k^6$. This rod $k^8$, as clearly shown in Fig. 5, is provided with an arm $k^9$, which is bifurcated at its lower end, so as to loosely embrace the pin $f'$ on one of the crank-connecting rods $f$, whereby it will be operated by the latter. The vibrating plate $k^6$ being thus operatively connected with the diaphragm $g'$, it will be understood that at each vibration of the diaphragm from one side of the chamber to the other the said plate $k^6$ will be likewise vibrated, and the projections $k^5$ $k^5$ thereon are so arranged relative to the points or prongs of the plate $k^4$, as shown in Fig. 6, that as the plate $k^6$ is vibrated in one direction it will engage one of the said prongs and move the same to give the index-spindle a partial turn, and thereby move the next prong into position to be engaged by the other projection $k^5$ on the return vibration of said plate $k^6$, as will be obvious upon reference to Fig. 6. The index being thus operatively connected with one of the diaphragms to be operated by the vibration thereof and the vibration of the two diaphragms being dependent one upon the other, as before described, it will be readily understood how the fluids or gases passing through the two measuring-chambers will be registered by the index, it being understood that the operation of the latter is regulated by the capacity of the meter with which it is connected.

Any suitable form of operative connection may be provided between the vibrating plate $k^6$ and its operating-diaphragm other than that shown without departure from my invention. For instance, in lieu of the bifurcated arm $k^9$ engaging the crank-arm connecting-pin of the link $f$, as shown, I sometimes employ a pivoted connecting-link, which is pivotally connected at its opposite ends with the said arm $k$ and link $f$, respectively.

Having thus illustrated and described my invention as embodied in one practical form, it will be obvious that the same may be more or less modified without departure from my invention. For instance, referring to Fig. 21, I have shown one of the measuring-chambers in a longitudinal cylindrical form, having a rigid piston-head or diaphragm $o$ therein as the equivalent of the flexible diaphragms $g$ and $g'$ hereinbefore described. In this construction the diaphragm $o$ is provided with suitable packing material $o'$, seated in its outer periphery, for engagement with the cylindrical wall of the chamber, whereby leakage is prevented between opposite sides of the same. The diaphragm thus constructed and arranged is operated to move back and forth across the chamber and operate the connected valve in the same manner as secured by the construction hereinbefore described, and for the purpose of my invention is the equivalent thereof.

Referring to Figs. 22 and 23, I have also shown a modified means for securing the disks forming the measuring-chambers together. In this instance I have shown a grooved band $p$ for embracing the flanges of the two disks to secure the same together in lieu of the screws shown in the other figures, which band is secured so as to clamp the disks by suitable fastening means, which, as shown in the drawings, consists of a screw $p'$.

Having thus set forth my invention, what I claim as new, and desire to secure by Letters Patent of the United States, is—

1. In a fluid or gas meter, the combination, with two measuring-chambers and diaphragms therein, of two separate valve-casings arranged at opposite sides of the meter, rotary valves located in said casings with their axes at substantially right angles to the direction of movement of the diaphragms and each having an axial shaft or extension connected with one of the latter, and passages connecting said measuring-chambers at opposite sides of the diaphragm with different ports of the valve-casings, for the purpose set forth.

2. In a fluid or gas meter, the combination, with two measuring-chambers and diaphragms therein, of two separate valve-casings arranged at opposite sides of the meter, rotary valves in said casings, each having a crank-arm connected with one of said diaphragms, the axes of the diaphragms and rotary valves being substantially in the same plane, and passages connecting said measuring-chambers at opposite sides of the diaphragm with different ports of the valve-casings, for the purpose set forth.

3. In a fluid or gas meter, the combination, of two measuring-chambers, diaphragms supported in said chambers and each being provided with a stem having a slot therein, two valve-casings, rotary valves supported in said casings and each being provided with a crank-arm, connecting-rods between said crank-arms and the diaphragm-stems having a loose connection with the latter within the said slots, and passages connecting the measuring-chambers with different ports of the valve-casings, for the purpose set forth.

4. In a fluid or gas meter, the combination, of two measuring-chambers, diaphragms supported within said chambers and each being provided with a stem, two valve-casings, rotary valves supported in said casings and each being provided with a crank-arm, connecting-rods between said crank-arms and the diaphragm-stems loosely connecting the same to permit a limited movement of one independent of the other, passages connecting the measuring-chambers with different ports of the valve-casings, and a registering device having operative connection with one of the diaphragms, for the purpose set forth.

5. In a fluid or gas meter, the combination with two measuring-chambers having diaphragms therein, and valve mechanism having operative connection with each of said diaphragms to be operated thereby to control the flow of fluid or gas to and from the opposite chambers, of a registering-index having its operating-spindle provided with projecting arms thereon, a pivoted vibrating plate having projections thereon for successively engaging said projecting arms to operate the index, and means forming an operative connection between one of the diaphragms and the said vibrating plate whereby the latter will be operated by said diaphragm, substantially as and for the purpose set forth.

6. In a fluid or gas meter, the combination with two measuring-chambers having diaphragms therein, and valve mechanism having operative connection with each of said diaphragms to be operated thereby to control the flow of the fluid or gas to and from the opposite chambers, of a registering-index having its operating-spindle provided with laterally-projecting arms thereon, a vibrating plate having means for successively engaging said projecting arms to operate the index, a spindle having a fixed connection with said plate to carry the same and provided with a laterally-projecting arm, and means operatively connecting said arm with one of the diaphragms, substantially as and for the purpose set forth.

WILLIAM J. GURD.

Witnesses:
  H. C. POPE,
  G. R. B. SIPPI.